Oct. 16, 1923.

K. A. SIMMON 1,470,771

CONTROL APPARATUS

Original Filed April 9, 1919

WITNESSES:
H.T. Shelhamer
W.R. Coley

INVENTOR
Karl A. Simmon
BY
ATTORNEY

Patented Oct. 16, 1923.

1,470,771

UNITED STATES PATENT OFFICE.

KARL A. SIMMON, OF EDGEWOOD PARK, PENNSYLVANIA, ASSIGNOR TO WESTING-HOUSE ELECTRIC & MANUFACTURING COMPANY, A CORPORATION OF PENNSYLVANIA.

CONTROL APPARATUS.

Original application filed April 9, 1919, Serial No. 288,858, now Patent No. 1,363,679, dated December 28, 1920. Divided and this application filed August 6, 1920. Serial No. 401,740.

*To all whom it may concern:*

Be it known that I, KARL A. SIMMON, a citizen of the United States, and a resident of Edgewood Park, in the county of Allegheny and State of Pennsylvania, have invented a new and useful Improvement in Control Apparatus, of which the following is a specification, this application being a division of my copending application, Serial No. 288,858, filed Apr. 9, 1919, now Patent No. 1,363,679, dated Dec. 28, 1920.

My invention relates to control apparatus for electrically-driven vehicles and particularly to the novel mounting or location thereof in various portions of the vehicle equipment.

It is the object of my invention to provide an arrangement of the above-indicated character, whereby empty or partially unoccupied spaces in present-day vehicles, such as the spaces under car seats may be employed for housing various control apparatus to correspondingly reduce the space and weight factors of vehicles, which reductions are particularly desirable under the modern practice of eliminating all unnecessary vehicle bulk and weight, for the many well-known advantages that accrue therefrom.

More specifically stated, it is an object of my invention to so locate the various control apparatus in compartments that are formed by otherwise employed portions of the vehicle, such as the car seats, that one of the compartment walls may be restrictedly moved, as by means of a hinged support, to permit ready accessibility of the uncovered apparatus for purposes of inspection or repair.

My invention may best be understood by reference to the accompanying drawings, wherein—

Figure 1:
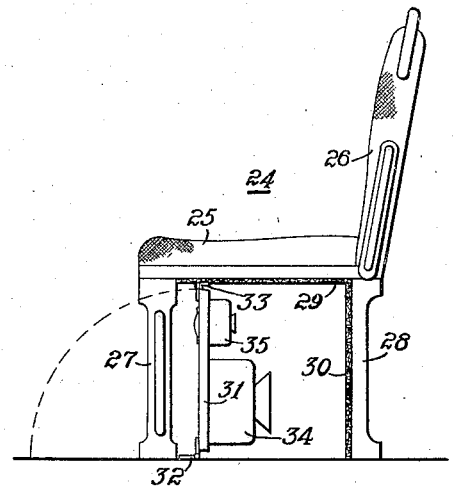
Figure 2:
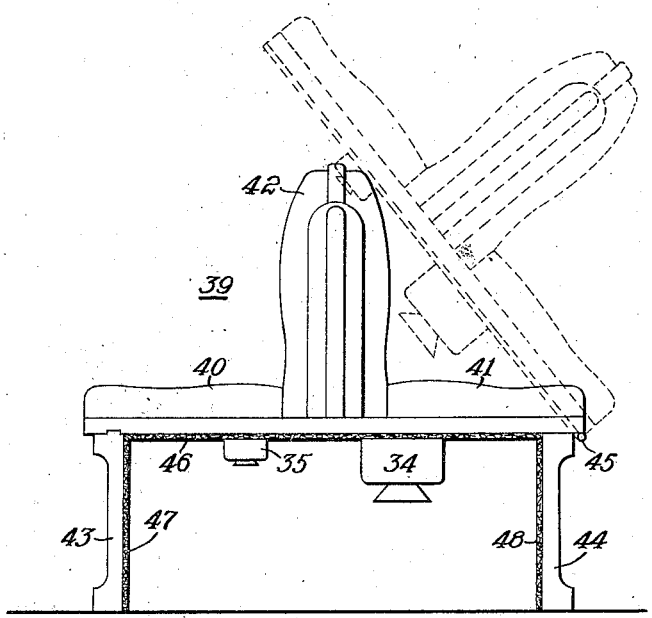

Fig. 1 and Fig. 2 are views, in end elevation, with parts removed, of vehicle seats that are employed in conjunction with the present invention.

Referring to Fig. 1, the apparatus shown comprises a reversible car seat 24, of a familiar form, having the usual seat proper 25 and the support or back 26, together with supporting legs or posts 27 and 28.

The control compartment under the seat is preferably lined, on at least two sides, with asbestos-protected steel plates 29 and 30, or the like, as is customary in the construction of unit-switch control groups at present. A panel or mounting board 31 is hinged to the car floor, as indicated at 32, and is held in the illustrated position by means of a latch or lock 33 that is fastened to the underside of the vehicle seat. Upon the panel 31 are mounted a plurality of unit switches or contactors 34 and 35, or other control apparatus for either the main or the auxiliary circuits of the vehicle. It will be understood that the inside wall of the vehicle, against which the seat 24 abuts, may be employed as one end cover for the control compartment, while a suitable permanent steel cover or the like may be placed at the other or aisle end.

For purposes of inspection or repair, the latch or lock 33 may be operated to permit the panel 31 to swing outwardly upon the car floor, as indicated by the dotted circle, whereby the control apparatus is readily accessible for the desired purpose.

Another form of my invention is shown in Fig. 2, which illustrates another familiar form of car seat 39 having seat members proper 40 and 41 and a common intermediate upright back or support 42. Supports or legs 43 and 44 are provided near the front ends of the seat members which, as a whole, are hinged or otherwise pivotally supported at one extremity, as indicated at 45. The control compartment beneath the seat is again lined with suitable asbestos-protected plates 46, 47 and 48, or the like, and suitable control apparatus, here indicated by the switching devices 34 and 35, is secured to the underside of the hinged seat member.

For purposes of inspection and repair, the seat member is swung upwardly around the pivotal point 45, as indicated by the dotted figure, to permit the desired ready accessibility of the control apparatus.

It will be appreciated that, if desired, a main reverser drum, a line switch or even a "K" controller may be housed beneath the seats illustrated in Fig. 1 and Fig. 2, to take the greatest advantage possible of all available space and to remove such apparatus from beneath the car floor, thus permitting the construction of a relatively low-floor car, or better wiring and repair facilities for the necessary apparatus under the car, such as the propelling motors.

I do not wish to be restricted to the specific structural details or arrangement of parts herein set forth, as various modifications thereof may be made without departing from the spirit and scope of my invention. I desire, therefore, that only such limitations shall be imposed thereupon as are indicated in the appended claims.

I claim as my invention:

1. In an electric vehicle, the combination with an electrical device normally located in a compartment under a vehicle seat, of means for swinging the device outside of said compartment into an uncovered position.

2. In an electric vehicle, the combination with an electrical device normally located in a compartment under a vehicle seat, of means for mounting said device on a movable wall of said compartment.

3. In an electric vehicle, the combination with a seat, of an electrical device pivotally mounted on a side wall of a compartment beneath said seat.

4. In an electric vehicle, the combination with a seat, of an electrical device secured to a movable wall of a compartment beneath said seat, and means for permitting only restricted movement of said device into an uncovered position.

5. In an electric vehicle, the combination with control apparatus normally located in a compartment under a vehicle seat, of means for mounting said apparatus on a wall of said compartment, and means for pivotally supporting said mounting wall to permit swinging the uncovered apparatus into an open and accessible position.

6. In an electric vehicle, the combination with control apparatus normally located in a compartment under a vehicle seat, of means for mounting said apparatus on a vertical wall of said compartment, and means for hingedly supporting said vertical wall to permit swinging the uncovered apparatus into an accessible position on the vehicle floor.

7. In an electric vehicle, the combination with control apparatus located in a compartment under a vehicle seat, of means for mounting said apparatus on the inner side of the front vertical wall of said compartment, and means for detachably retaining said wall in position.

In testimony whereof, I have hereunto subscribed my name this 30th day of July 1920.

KARL A. SIMMON.